UNITED STATES PATENT OFFICE.

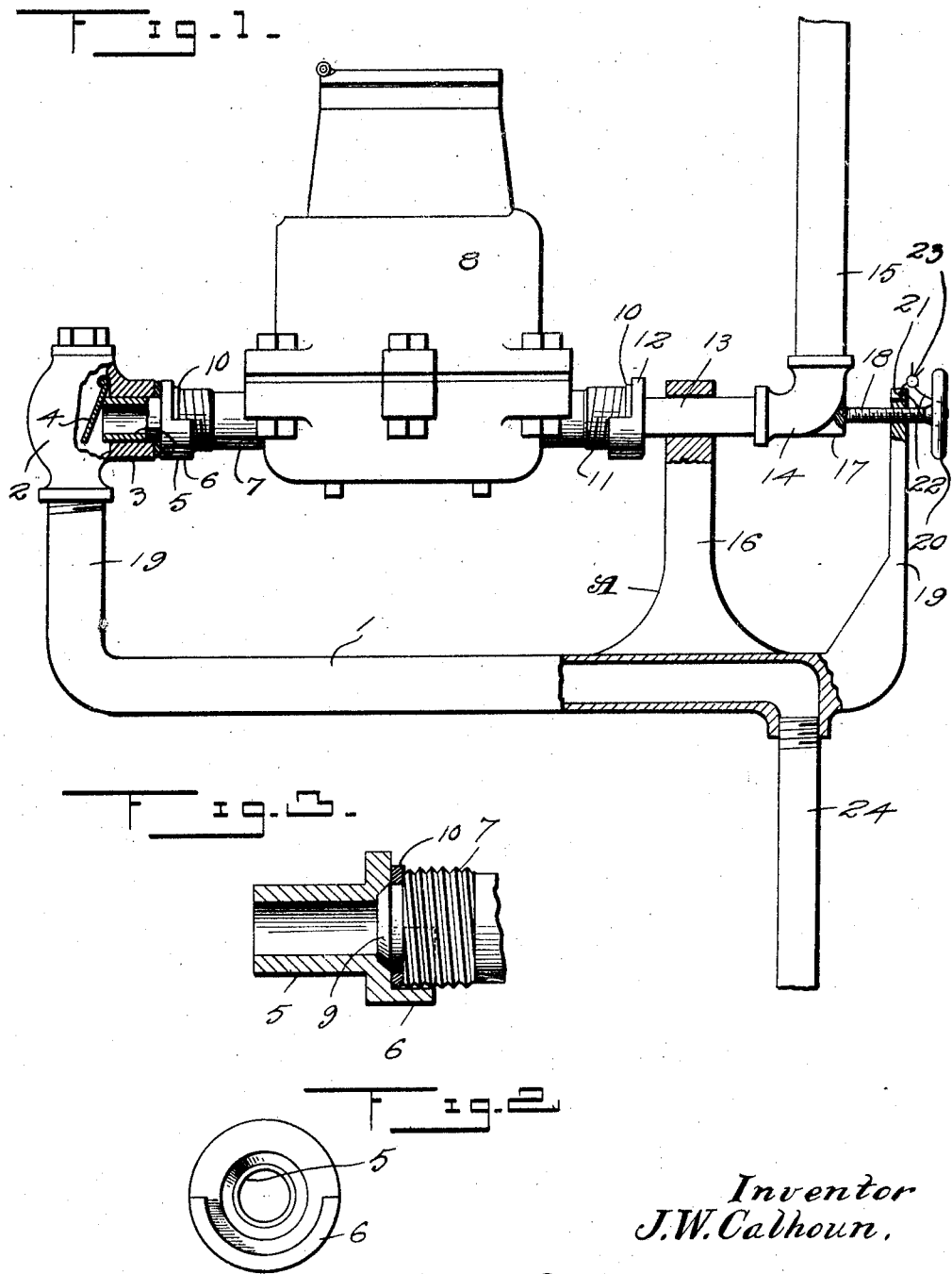

JOHN W. CALHOUN, OF CHESTER, PENNSYLVANIA.

METER CONNECTION AND CONTROLLING MEANS.

1,345,124.

Specification of Letters Patent. Patented June 29, 1920.

Application filed May 3, 1919. Serial No. 294,403.

*To all whom it may concern:*

Be it known that I, JOHN W. CALHOUN, a citizen of the United States, residing at Chester, in the county of Delaware and State of Pennsylvania, have invented certain new and useful Improvements in Meter Connections and Controlling Means; and I do hereby declare the following to be a full, clear, and exact description of the invention, such as will enable others skilled in the art to which it appertains to make and use the same.

This invention relates to meter connections and controlling means and more particularly to means for connecting up water meters.

One of the main objects of the invention is to provide simple and efficient means whereby a water meter may be readily connected into a water supply system without the use of wrenches and similar tools.

A further object is to provide means whereby the meter may be tightly secured in position so as to insure water-tight joints, the means for securing the meter in position also providing means whereby the meter may be sealed so as to effectually prevent tampering therewith.

Another object is to provide control means whereby the water supply is automatically shut off simultaneously with the removal of the meter, and is renewed by the act of securing the meter in position.

Further objects will appear from the detailed description.

In the drawings:

Figure 1 is a front view, partly in section, of a meter controlling and connecting means constructed in accordance with my invention as applied.

Fig. 2 is a detail end view of one of the coupling members.

Fig. 3 is a vertical central section through one of the couplings and associated parts.

In carrying my invention into effect, I provide a meter supporting frame designated generally by A, this frame being provided with a tubular base 1 of substantial rectangular or L-shape. A valve casing 2 is secured upon the upper end of the vertical arm 1ª of base 1, this casing being provided with an outlet nipple 3 the inner end of which is faced to provide a valve seat for a swinging valve 4 pivoted in the casing adjacent the top thereof, this valve acting to close the outlet nipple 3 of the valve casing when the meter and the parts associated therewith are removed. Nipple 3 snugly receives a tubular member or thimble 5 carried by a coupling member 6 of substantial U-shape which receives the end portion of a nipple 7 projecting from the inlet end of the meter casing 8. Coupling member 6 is provided with a reduced central recess the outer end portion of which is tapered to receive a correspondingly shaped extension 9 of nipple 7, a suitable packing gasket 10 being placed about member 9 so as to form a water-tight closure at the outer end of the nipple. A similar nipple 11 projects from the outlet end of the meter casing 8 and is coupled in a similar manner to a coupling member 12 and a nipple 13 carried thereby which is connected at its outer end, by means of an elbow 14, to the water outlet or distributing pipe 15. Nipple 13 fits snugly through the upper end of a standard 16 projecting from base 1 and is supported thereby so as to be in alinement with nipple 3 of valve casing 2. This insures proper alining of the inlet and outlet nipples and the parts associated therewith so as to effectually avoid all unnecessary strain and leaky joints such as results from failure to properly aline these members.

Elbow 14 is provided with an integral projection 17 which receives the reduced inner end of a locking and pressure screw 18 which is threaded through the upper end of a bracket arm 19 projecting from the other end of base 1, this screw being provided at its outer end with a hand wheel 20 fixedly secured thereon. Arm 19 is provided adjacent its upper end with a suitable opening 21 which receives a sealing wire 22 which is passed through the hand wheel 20, the ends of this wire being secured together by a seal 23. By this means, after the meter has been properly secured in position, unauthorized removal or tampering with the meter is prevented. A water inlet or supply pipe 24 communicates with the tubular base 1 at the end thereof remote from the vertical arm 1ª, the water flowing through the base and valve casing 2 and the parts associated therewith to and through the meter, and thence into the supply or distributing pipe 15. In applying the meter, coupling member 6 is placed in position in alinement with member 12 with its open portion up, member 5 not being inserted into nipple 3 a sufficient distance to unseat valve 4, the screw 18 being turned out so as to permit outward movement of coupling member 12 away from member 6. After this has been done, the nipples 7 and 11 are fitted into the coupling members 6 and 12, respectively. The screw 18 is then turned in so as to force thimble 5 into nipple 3 thus raising or unseating valve 4 so as to permit the water to flow into and through the meter. Gasket 10 is mounted about nipple 5 between the outer end of nipple 3 and coupling member 6 so that, when the screw 18 is turned in through bracket arm 19, a tight closure is obtained at the outer end of nipple 3 so as to effectually prevent leakage at this joint. When it is desired to remove the meter, pressure screw 18 is turned outwardly the meter being then moved toward this screw so as to move the thimble 5 outwardly and permit seating of valve 4 by pressure of the water in valve casing 2, after which the meter may be shifted so as to release nipples 7 and 11 from the coupling members 6 and 12, respectively, the meter being then readily lifted out of these coupling members. By this arrangement, the meter may be quickly and easily installed or removed, and the water supply is automatically turned on or cut off, as the case may be, at such time. Also, by providing the valve 4 I render it difficult for unauthorized persons to obtain water from the supply pipe 24 after the meter has been removed, since this valve is inclosed within the casing 2 and is not readily accessible.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a device of the character stated, a supporting frame including a tubular member adapted to be connected at one end with a supply pipe, a valve casing secured on the other end of said tubular member, a swing valve mounted in said casing for closing the outlet thereof, a tubular member removably mounted in the outlet end of the valve casing and engaging said valve so as to hold the same away from its seat, a nipple supported by said supporting frame in alinement with the outlet of the valve casing, a meter provided with inlet and outlet nipples, means for coupling the nipples of said meter to the tubular member and to the nipple carried by the supporting frame, respectively, and means for securing the tubular member against movement and for releasably securing the meter in position.

2. In a device of the character stated, a supporting frame including a tubular base adapted to be connected at one end to a water supply pipe and provided with a vertical arm at its other end, a valve casing secured on the upper end of said arm and provided with an outlet nipple, a downwardly swinging valve mounted in said casing for closing the inner end of said nipple, a coupling member provided with a tubular extension insertible into the nipple of the valve casing and of such length as to unseat the valve when inserted into the nipple to its greatest extent, a standard carried by the supporting frame, a coupling member provided with a nipple mounted in said standard in alinement with the first mentioned coupling member, said coupling members being adapted to receive the inlet and outlet nipples of a water meter inserted therein, an elbow carried by the outer end of the nipple mounted in said standard and adapted to be connected to a water distributing pipe, and a pressure screw carried by said supporting frame and engaging said elbow so as to force the same toward the outlet nipple of the valve casing for forcing the tubular member of the first mentioned coupling member into position to unseat the valve when the water meter is placed in position with the nipples thereof mounted in the coupling members.

3. In a device of the character stated, a combination with a supporting frame including a tubular base adapted to be connected at one end with a water supply pipe and provided at the other end with a vertical arm, a valve casing secured on the upper end of said arm and provided with an outlet nipple, a swinging valve mounted in said casing for closing the inner end of said base nipple, a bracket arm carried by the base at the other end thereof, a standard carried by said base, a nipple mounted in the upper end of said standard in alinement with the nipple of the valve casing and provided at its inner end with a substantially U-shaped coupling member, a similar coupling member provided with a tubular extension fitting snugly into the nipple of the valve casing and of such length as to unseat said valve, a meter provided at opposite ends of its casing with nipples adapted to fit snugly into said coupling members and coacting therewith to effect water-tight couplings, an elbow secured on the outer end of the nipple carried by said standard and adapted to be connected to the water distributing pipe, and a pressure screw threaded through said bracket arm and engaging said elbow.

In testimony whereof I affix my signature in presence of two witnesses.

JOHN W. CALHOUN.

Witnesses:
 ROBT. JAGGERS, Jr.,
 JOHN HIGGIN.